United States Patent [19]

Lanham et al.

[11] Patent Number: 4,544,352
[45] Date of Patent: Oct. 1, 1985

[54] BAKING OVEN WITH HEATED AIR DISTRIBUTION

[75] Inventors: William E. Lanham, Conyers; Stephen R. Smith, Tucker, both of Ga.

[73] Assignee: Lanham Machinery Company, Inc.

[21] Appl. No.: 559,892

[22] Filed: Dec. 9, 1983

[51] Int. Cl.⁴ .............................................. F27B 9/00
[52] U.S. Cl. .................................. 432/133; 432/176; 432/199; 34/207; 126/21 A; 99/443 C
[58] Field of Search ............. 126/21 R, 21 A; 99/447, 99/443 C; 432/176, 133, 199; 34/236, 196, 207, 208

[56] References Cited

U.S. PATENT DOCUMENTS

| | | | |
|---|---|---|---|
| 798,345 | 8/1905 | Johnson | 34/207 |
| 811,315 | 1/1906 | McCabe | 104/69 |
| 1,790,876 | 2/1931 | Mueller | 432/133 |
| 2,236,085 | 3/1941 | Cook | 432/176 |
| 2,289,629 | 7/1941 | Cook | 432/176 |
| 2,373,076 | 4/1945 | Engels | 99/443 C |
| 2,709,412 | 5/1955 | Eagerman | 99/362 |
| 2,961,976 | 11/1960 | Ooms | 432/51 |
| 3,211,274 | 10/1965 | Keyes et al. | 198/799 |
| 3,285,394 | 11/1966 | Lanham et al. | 198/814 |
| 3,478,705 | 11/1969 | Lanham et al. | 34/207 |
| 3,581,679 | 6/1971 | Jansen et al. | 432/199 |
| 3,589,307 | 6/1971 | Lanham | 432/49 |
| 4,309,171 | 1/1982 | Gentry | 432/163 |

Primary Examiner—James C. Yeung
Attorney, Agent, or Firm—Pasquale A. Razzano

[57] ABSTRACT

A bakery oven, of the type employing a continuous spiral conveyor for carrying the goods to be baked through the oven enclosure, employs an air distribution system to direct heated air from near the top wall of the oven enclosure to a plenum chamber, and from there through a pipe distribution network to at least certain ones of the tiers of the spiral conveyor. Preferably, heater elements are disposed beneath alternate ones of the tiers of the conveyor system within the oven enclosure, while the air distribution pipes are disposed parallel to and beneath the remaining tiers. This arrangement serves to decrease fuel consumption for the burners, thereby increasing productivity, and further serves to decrease the stratification of heat layers within the oven enclosure, thereby providing uniform baking conditions throughout the oven enclosure.

9 Claims, 5 Drawing Figures

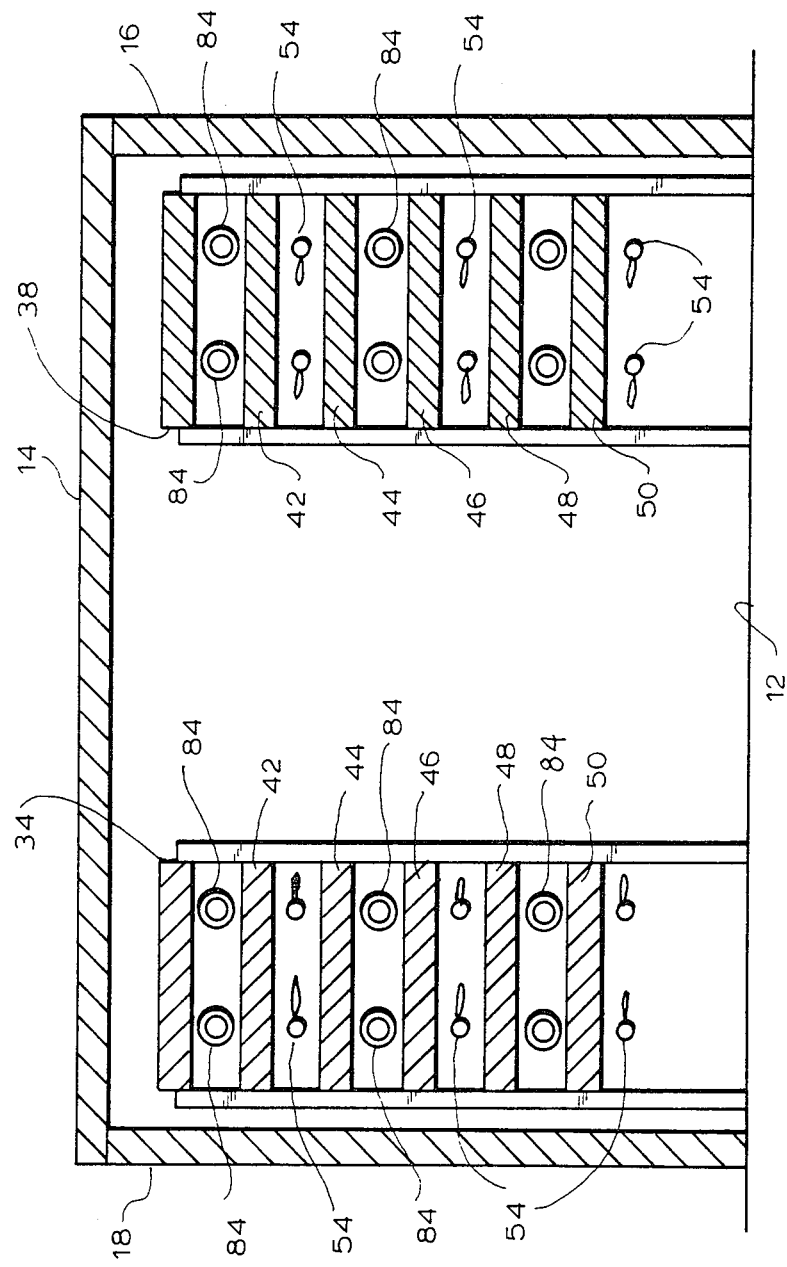

BAKING OVEN WITH HEATED AIR DISTRIBUTION

This invention relates to ovens, and is more particularly directed to ovens for bakery products which are conveyed continuously through the oven's insulated enclosure on a so-called endless spiral conveyor. This invention is further directed to such a baking oven incorporating an air distribution system to direct heated air to predetermined places within the oven enclosure to create a more uniform baking pattern by decreasing the stratification of heat within the oven enclosure. The invention is further directed to such an oven incorporating means to decrease the energy requirements for the oven.

Ovens that incorporate spiral oven conveyor systems have been previously proposed, for example, in U.S. Pat. No. 3,478,705 of Nov. 18, 1969. With such a spiral conveyor system, a series of uncooked bakery goods are brought into the oven and are carried all along the same path throughout the oven. With this arrangement, the bakery goods are each exposed to exactly the same baking conditions, so that each item receives the same degree and character of baking. This leads to uniform baking of baked goods. The baked goods can be of any type produced in a bakery, such as breads, rolls, cookies, cakes, pies, pastries, and the like.

The same system can further be used for proofing raw dough prior to baking, and has the advantage that each item receives the same amount of proofing; accordingly, each loaf of bread, for example, rises by the same amount prior to baking.

In order to provide still more uniform baking of the bread, rolls, or other baked goods in the oven, it has been also proposed, for example, in U.S. Pat. No. 3,589,307 of June 29, 1971, to arrange the spiral conveyor within the oven in successive tiers, and to place individually-controllable burner elements parallel to, and beneath alternate ones of these conveyor tiers. This results in a controlled, substantially uniform temperature throughout the oven enclosure, so that the baked goods receive more-or-less even baking over their entire passage along the spiral conveyor through the oven.

However, it has been discovered that even with the improvements previously proposed, there is a substantial amount of heat stratification within the oven, so that the loaves of bread or other bakery goods being conveyed on the upper conveyor tiers are subjected to more intense heat than those on the lower tiers. It is much simpler to control the texture, crust thickness, and other qualities of the baked goods if it possible to decrease, or to minimize the heat stratification within the oven. Further, the stratification of heat involves wastage of heat, and thus requires substantially more fuel to heat the oven so that even the lower tiers of the conveyor are at sufficient baking temperatures, than if the stratification were eliminated or minimized.

Accordingly, it is an object of this invention to provide an improved oven for bakery products which avoids the drawbacks of the prior art.

It is a further object of this invention to provide an oven construction for baking bread, rolls, or other bakery goods, in which the bakery goods are subjected to substantially uniform baking conditions throughout their journey through the oven.

It is still a further object of this invention to provide a bakery oven, of the type having a spiral conveyor, and in which air distribution means are incorporated to distribute the heated air throughout the oven in a manner both to decrease fuel consumption for the oven burners and also to minimize stratification of heat within the oven.

According to a significant aspect of this invention, a baking oven has an oven enclosure including a floor, sides, a front wall, a back wall, and a top wall. A spiral conveyor has an ingress conveyor section for carrying the bakery goods to be baked into the enclosure, a first conveyor tier within the oven enclosure and coupled to the ingress conveyor section, and a plurality of further conveyor tiers disposed within the oven enclosure and linked serially one above the next, with an egress conveyor section carrying the baked goods from the last of the conveyor tiers out of the oven enclosure. A heater or heaters (typically gas burners) within the oven enclosure heat the air within the enclosure for baking the goods that are being carried on the tiers of the conveyor within the oven enclosure. In order to ensure even heat distribution within the oven enclosure, by minimizing stratification of heat within the oven enclosure, an air distribution system takes the heated air from near the top wall of the oven enclosure, and distributes the air, through a plenum chamber and thence through a piping conduit network, beneath at least selected ones of the conveyor tiers. This arrangement has the further benefit of also minimizing the amount of fuel required for the heater or heaters, because it significantly reduces wastage of heat.

In several preferred embodiments of this invention, the heaters for the oven include a plurality of heating elements disposed within the oven enclosure, and these are located parallel to and disposed beneath alternate ones of the tiers of the spiral conveyor. In such case, the piping conduit network includes a plurality of air distribution pipes within the oven enclosure, and extending parallel to and beneath at least certain ones of the others of the tiers of the spiral conveyor.

The foregoing and many other objects, features, and advantages of this invention will be more fully understood from the ensuing detailed description of a preferred embodiment, when considered in connection with the accompanying drawings, in which:

FIG. 5 is a sectional elevational view taken along the line 5—5 of FIG. 4.

Figure 1:
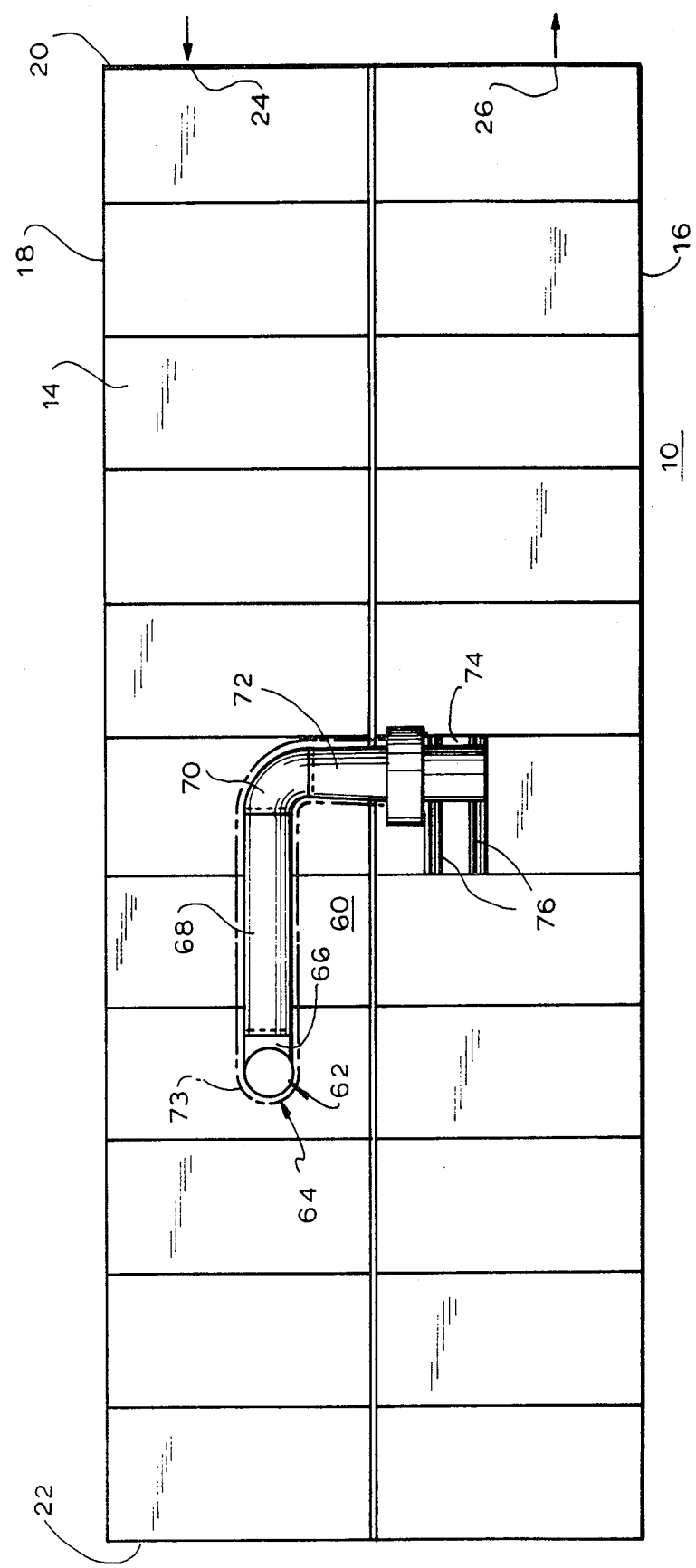
FIG. 1 is a plan view of a baking oven according to an embodiment of this invention.
Figure 2:
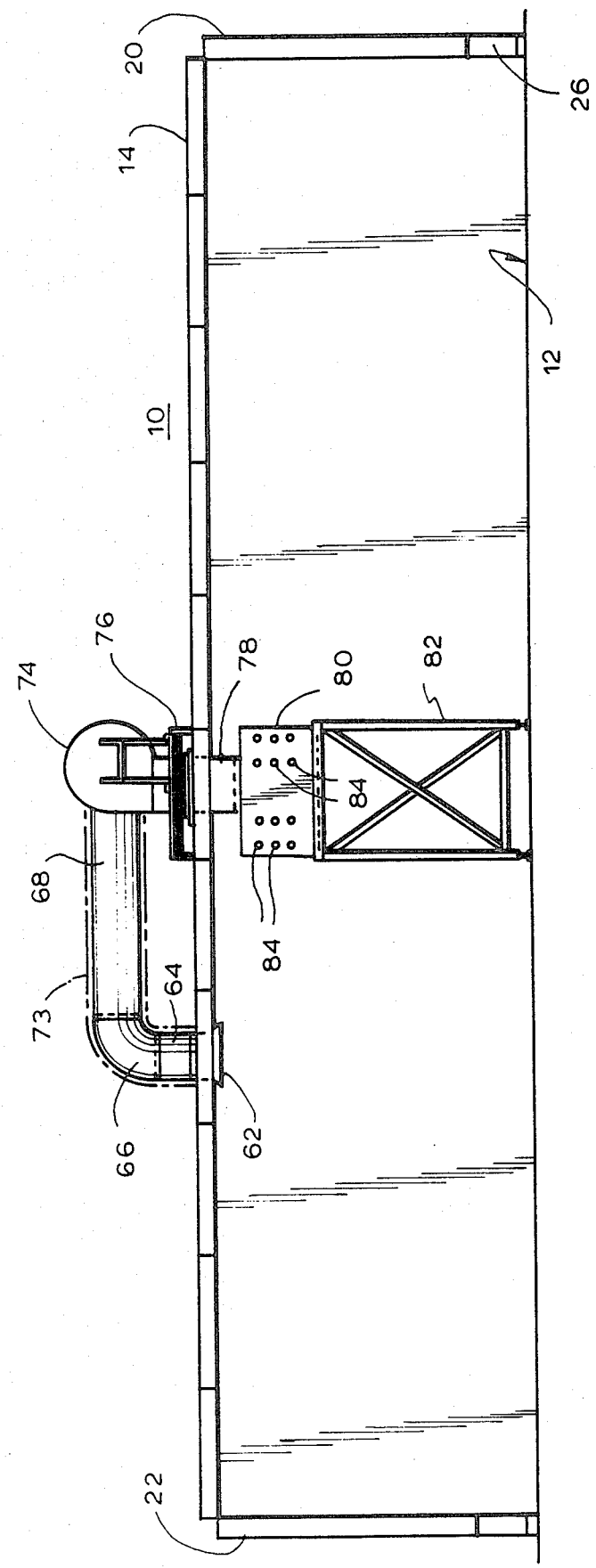
FIG. 2 is a sectional elevation of the embodiment of FIG. 1.

With reference to the drawings, a baking oven has an enclosure 10 shown to be constructed generally in the form of a rectangular parallelepiped having a floor 12, a top wall 14, side walls 16 and 18, and end walls 20 and 22. The latter can be considered to be the front and the back of the oven. In the end wall 20 there are openings forming a conveyor port 24 through which baked goods are conveyed into the oven enclosure 10, and another conveyor port 26, out of which the baked goods are conveyed from the oven enclosure.

The walls 14, 16, 18, 20, and 22 are preferably well insulated with a suitable insulating material. Such walls can be generally of the construction disclosed in U.S. Pat. No. 3,589,307, mentioned previously.

In order to carry the bakery products along a path through the oven 10, there is provided a spiral conveyor system 30, which can be of the type disclosed, for example, in U.S. Pat. No. 3,478,705, which, for the sake of brevity, is incorporated herein by reference. Accordingly, only the essence of the operation and construction of the spiral conveyor system 30 need be discussed here.

With the conveyor system 30, the bakery goods follow a more-or-less spiral path within the oven enclosure 10, so that each bakery good, that is, each loaf of bread, or each roll, cake, or cookie, traverses exactly the same path within the oven, so that all receive the same amount and same degree of baking.

Unbaked goods enter on an ingress conveyor section 32 through the port 24, and this section 32 connects to one side of a first tier 34. The bakery goods are then conveyed around a curved horseshoe end 36 of the first tier to the other side 38 of the first tier, whence they are conveyed around another curved end 40, to a second tier 42 of similar construction. The bakery goods are conveyed in like manner to a third tier 44, a fourth tier 46, a fifth tier 48, a sixth tier 50, and thence to an egress conveyor section 52 on which baked goods leave the oven through the conveyor port 26.

Heating elements are distributed, for example, in side by side fashion beneath alternate tiers. In the embodiment as particularly shown in FIG. 5, these heating elements are gas burners, and are arranged in parallel pairs along and beneath the tiers 42, 46, and 50, and equidistant on either side of the conveyor centerline.

This arrangement is also discussed in U.S. Pat. No. 3,589,307. Preferably, the heating elements 54 are individually controlled, so that the bakery goods receive even, substantially uniform heating throughout all sections of the oven.

A special feature of the oven 10 of this embodiment is the air distribution system 60. In this system 60, an oven exhaust duct 62 has a mouth for taking heated air from near the top wall 14 of the oven enclosure 10. This exhaust duct 62 connects to a vertical duct 64, which is connected by means of an elbow 66 to a horizontal duct 68, the latter being connected through another elbow 70 to an expander 72. Covering all of the foregoing duct members 62, 64, 66, 68, 70, and 72 is an insulation blanket 73, preferably of 2" thick high-temperature insulation.

The expander connects to the intake side of a blower 74 mounted on a blower support 76 atop the top wall 14 of the oven enclosure 10. This blower support 76 is favorably formed of a pair of back-to-back channel members. The exhaust side of the blower 74 is connected to a rectangular duct 78. This duct 78 passes downward through the top wall 14 to a plenum chamber 80, formed as a rectangular boxlike member, which is situated atop a plenum chamber support 82 within the central portion of the oven enclosure 10 in an open area encircled by the spiral tiers of the conveyor system 30. The plenum chamber is supported near the top wall 14, i.e., away from the floor 12.

A plurality of distribution pipes 84 extend generally laterally outward from the plenum chamber 80 towards the side walls 16 and 18 of the oven enclosure.

Figure 3:
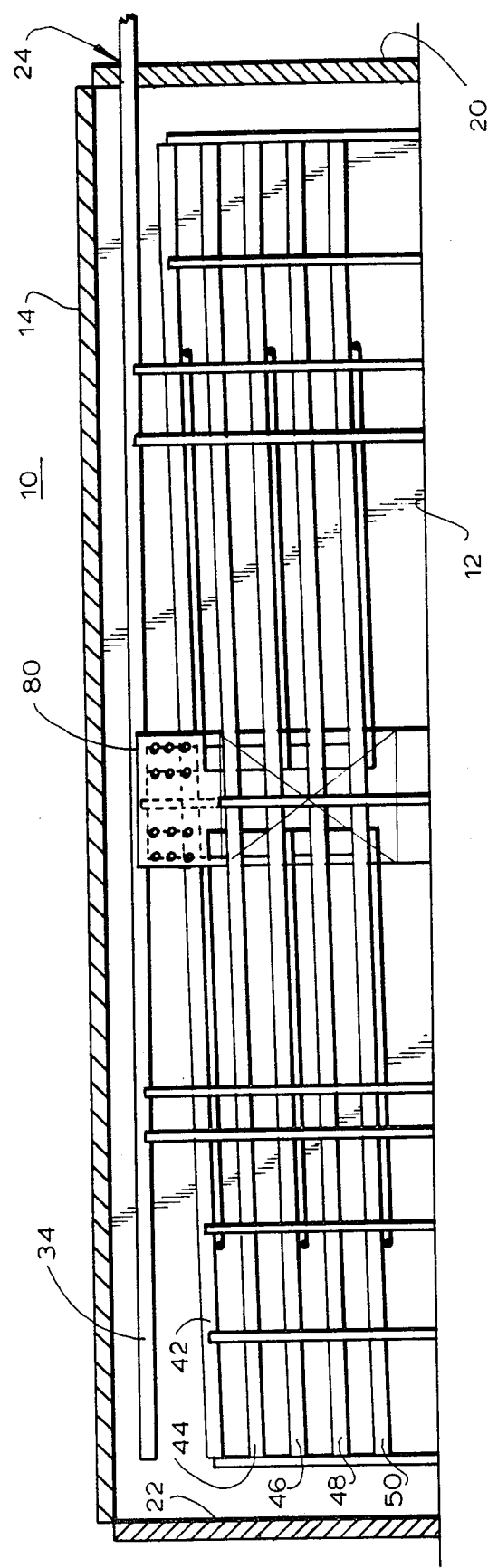
FIG. 3 is another sectional elevation, diagrammatically showing the arrangement of air distribution pipes within the oven enclosure.
Figure 4:
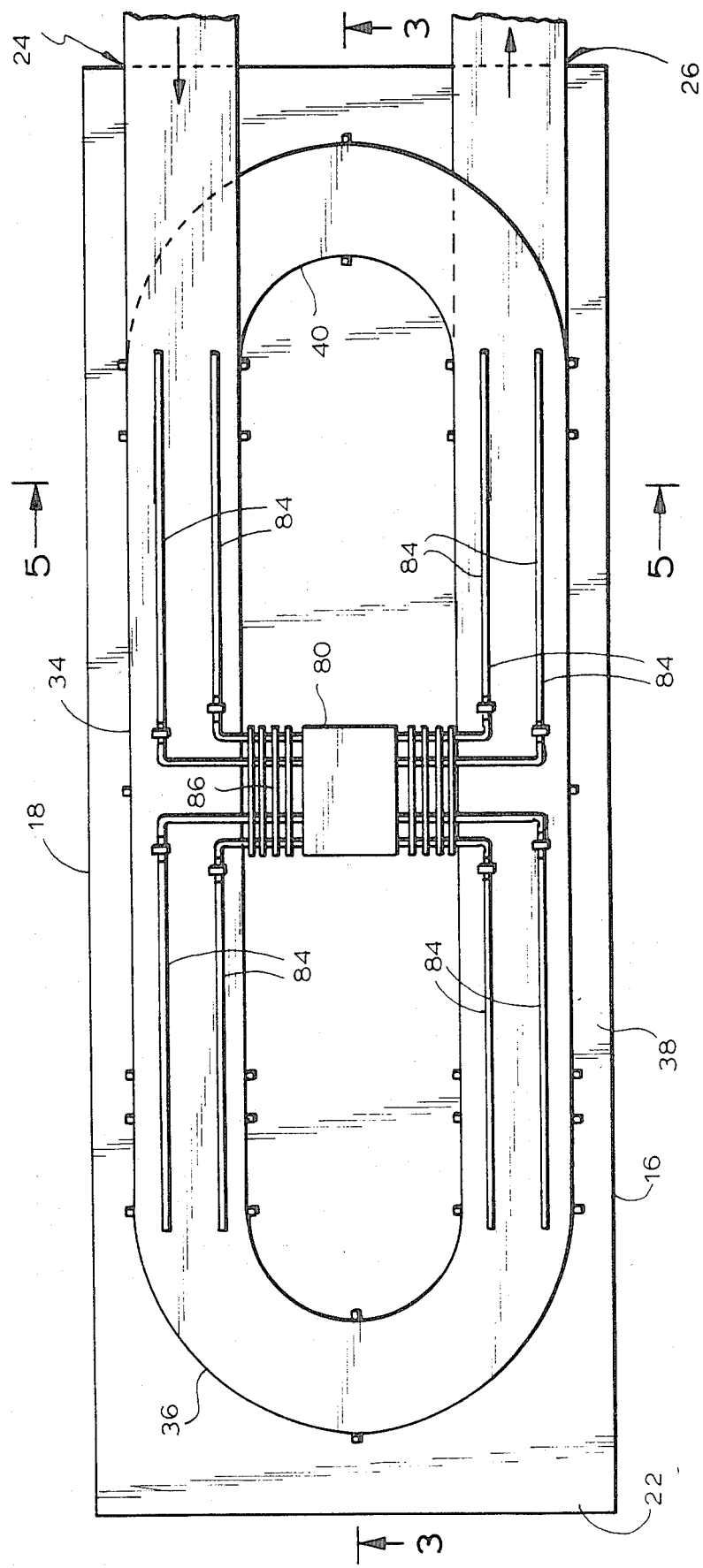
FIG. 4 is a sectional view showing a horizontal section of the oven of this embodiment.

As perhaps best shown in FIGS. 3 and 4, these pipes 84 extend outwardly in pairs from the plenum chamber 80, so that, for each side of each of selected ones of the conveyor tiers, two pairs of pipes 84 extend, over a pipe support 86, towards its respective side wall 16 or 18. Then, the pipes 84 bend, and continue laterally, so that one pair of pipes 84 extends, with the pipes parallel to one another beneath the associated conveyor tier, towards the front of the oven, and the other pair of pipes 84 extends in like manner towards the back of the oven.

The pipes 84 are also adjustable, so that the air distribution can be adjusted for uniform baking. Further, openings can be provided at various positions along the pipes 84, so that the heated air will escape from the pipes 84 where it is most needed.

As is perhaps best shown in FIG. 5, the pairs of pipes 84 are favorably disposed beneath the tiers 34(38), 44, and 48, and with the pipes 84 of each pair substantially equidistant from the respective conveyor centerline and on either side thereof. In other words, in this embodiment the heating elements 54 are disposed within the oven enclosure beneath alternate ones of the conveyors tiers 42, 46, and 50, while the air distribution pipes are disposed beneath the remaining ones of the conveyor tiers 34(38), 44, and 48.

It should be understood that this invention is not limited to precise embodiment disclosed hereinabove. For example, the spiral path which the bread or other bakery goods follow through the oven enclosure can extend either from the top tier 34(38) to the bottom tier 50 of the oven enclosure 10, or can alternatively extend from the bottom tier 50 to the top tier 34(38). Moreover, while the heating elements 54 and the air distribution 84 are disposed between alternate ones of the tiers of the conveyor system, it is also possible following the principles of this invention that only selected ones of the tiers 34, 42, 44, 46, 48, and 40 have the heating elements disposed them, and that only certain others of the remaining tiers have the air distribution pipes disposed therebeneath.

It should be apparent that with ovens constructed according to the principles of this invention, a more uniform baking heat is provided throughout the entire oven enclosure 10. Furthermore, it should be apparent that heat, in the form of heated air which might otherwise escape through cracks or other openings near the top wall 14 of the oven, is captured and recycled downwards through the oven. Thus, heat is used which might otherwise be lost, saving energy costs.

There is a complete elimination of oven flash heat with the arrangement of this invention; consequently, the products have uniform color from the beginning to the end of a product run. This eliminates the operator's concern about adjusting the burner control for breaks in production of the baked products. Hence, the improvement of this invention yields substantially enhanced burner efficiency.

Furthermore, the recycled heated air fed from the pipes 84 does not produce any additional weight loss or drying of the baked product. That is, the product does not "dry out" because of hot air blowing onto the product surface. This favorable property has been discovered empirically by operating an oven system constructed according to this invention.

Of course, while one embodiment of this invention has been described in detail hereinabove, it should be apparent that many modifications and variations thereof would present themselves to persons of ordinary skill in the art without departure from the scope and spirit of this invention, which are to be defined by the appended claims.

We claim:

1. A baking oven comprising oven enclosure means including a floor, side walls, a front, a back, and a top wall; a spiral conveyor including an ingress conveyor section for carrying bakery goods to be baked into said enclosure means, a first conveyor tier disposed within said oven enclosure means and coupled to said ingress conveyor section, a plurality of further conveyor tiers disposed within said oven enclosure means and linked serially one above the other, and an egress conveyor section carrying baked bakery goods from a final one of said conveyor tiers out of said oven enclosure means; heating means within said oven enclosure means for heating the air therewithin for baking the bakery goods being carried on said conveyor tiers in said oven enclosure means; and air distribution means taking heated air from near the top wall of said oven enclosure means and distributing the heated air, through a piping conduit network, between at least selected ones of said conveyor tiers, such that the heat distribution within said oven enclosure means is rendered uniform by minimizing stratification of heat within said oven enclosure means, and also such that the amount of energy required for said heating means is reduced, wherein said heating means includes a plurality of heating elements disposed within said oven enclosure means and located parallel to and beneath alternate ones only of the tiers of the spiral conveyor; and wherein said piping conduit network includes a plurality of air distribution pipes within said oven enclosure means and extending parallel to and beneath the remaining ones only of said conveyor tiers.

2. A baking oven according to claim 1, wherein said spiral conveyor defines a central open area within said oven enclosure means; and said air distribution means includes a plenum chamber within said central open area and means directing said heated air into said plenum chamber; with said piping conduit extending from said plenum chamber to said spiral conveyor.

3. A baking oven according to claim 2, wherein said heated air directing means includes a hot air duct having a mouth disposed in said top wall and extending out above said oven enclosure means, a blower having an input coupled to said hot air duct and an output, and a return duct extending from the blower output through said top wall to said plenum chamber.

4. A baking oven according to claim 2. wherein said plenum chamber includes a rectangular box member and support means supporting said box member near the top wall of said oven enclosure means.

5. A baking oven according to claim 2, wherein said air distribution pipes each extend from said plenum chamber toward a particular one of said side walls, and then bend to extend beneath the particular selected one of said conveyor tiers.

6. A baking oven comprising oven enclosure means including a floor, side walls, a front, a back, and a top wall; a spiral conveyor including an ingress conveyor section for carrying bakery goods to be baked into said enclosure means, a first conveyor tier disposed within said oven enclosure means and coupled to said ingress conveyor section, a plurality of further conveyor tiers disposed within said oven enclosure means and linked serially one above the other, and an egress conveyor section carrying baked bakery goods from a final one of said conveyor tiers out of said oven enclosure means; heating means within said oven enclosure means for heating the air therewithin for baking the bakery goods being carried on said conveyor tiers in said oven enclosure means; and air distribution means taking heated air from near the top wall of said oven enclosure means and distributing the heated air, through a piping conduit network, between at least selected ones of said conveyor tiers, such that the heat distribution within said oven enclosure means is rendered uniform by minimizing stratification of heat within said oven enclosure means, and also such that the amount of energy required for said heating means is reduced, wherein said spiral conveyor defines a central open area within said oven enclosure means; and said air distribution means includes a plenum chamber within said central open area and means directing said heated air into said plenum chamber; with said piping conduit extending from said plenum chamber to said spiral conveyor; wherein said heated air directing means includes a hot air duct having a mouth disposed in said top wall and extending out above said oven enclosure means, a blower atop the oven enclosure means and having an input coupled to said hot air duct and an output, and a return duct extending from the blower output through said top wall to said plenum chamber; and wherein said heated air directing means further includes an insulating blanket covering said hot air duct.

7. A baking oven comprising oven enclosure means including a floor, side walls, a front, a back, and a top wall; a spiral conveyor including an ingress conveyor section for carrying bakery goods to be baked into said enclosure means, a first conveyor tier disposed within said oven enclosure means and coupled to said ingress conveyor section, a plurality of further conveyor tiers disposed within said oven enclosure means and linked serially one above the other, and an egress conveyor section carrying baked bakery goods from a final one of said conveyor tiers out of said oven enclosure means; heating means within said oven enclosure means for heating the air therewithin for baking the bakery goods being carried on said conveyor tiers in said oven enclosure means; and air distribution means taking heated air from near the top wall of said oven enclosure means and distributing the heated air, through a piping conduit network, between at least selected ones of said conveyor tiers, such that the heat distribution within said oven enclosure means is rendered uniform by minimizing stratification of heat within said oven enclosure means, and also such that the amount of energy required for said heating means is reduced, wherein said spiral conveyor defines a central open area within said oven enclosure means; and said air distribution means includes a plenum chamber within said central open area and means directing said heated air into said plenum chamber; with said piping conduit extending from said plenum chamber to said spiral conveyor, wherein said plenum chamber includes a rectangular box member and support means supporting said box member near the top wall of said oven enclosure means, and wherein, for each selected conveyor tier, on each side of the oven enclosure means, two pairs of said air distribution pipes extend from said plenum chamber, with one pair extending parallel to one another beneath said selected conveyor tier and towards the front of the oven enclosure means, and with the other, associated pair extending parallel to one another beneath said selected conveyor tier and towards the back of the oven enclosure means.

8. A baking oven according to claim 7, wherein each said pair is arranged with the pipes thereof on opposite sides of the centerline of the respective conveyor and substantially equidistant from it.

9. A baking oven comprising oven enclosure means including a floor, side walls, a front, a back, and a top wall, a spiral conveyor including an ingress conveyor section for carrying bakery goods to be baked into said enclosure means, a first conveyor tier disposed within said oven enclosure means and coupled to said ingress conveyor section, a plurality of further conveyor tiers disposed within said oven enclosure means and linked serially one above the other, and an egress conveyor section carrying baked bakery goods from a final one of said conveyor tiers out of said oven enclosure means; heating means within said oven enclosure means for heating the air therewithin for baking the bakery goods being carried on said conveyor tiers in said oven enclosure means; and air distribution means taking heated air from near the top wall of said oven enclosure means and distributing the heated air, through a piping conduit network, between at least selected ones of said conveyor tiers, such that the heat distribution within said oven enclosure means is rendered uniform by minimizing stratification of heat within said oven enclosure means, and also such that the amount of energy required for said heating means is reduced, wherein for each selected conveyor tier, on each side of the oven enclosure means, two pairs of said air distribution pipes extend from said plenum chamber, with one pair extending parallel to one another beneath said selected conveyor tier and towards the front of the oven enclosure means, and with the other, associated pair extending parallel to one another beneath said selected conveyor tier and towards the back of the oven enclosure means.

* * * * *